UNITED STATES PATENT OFFICE.

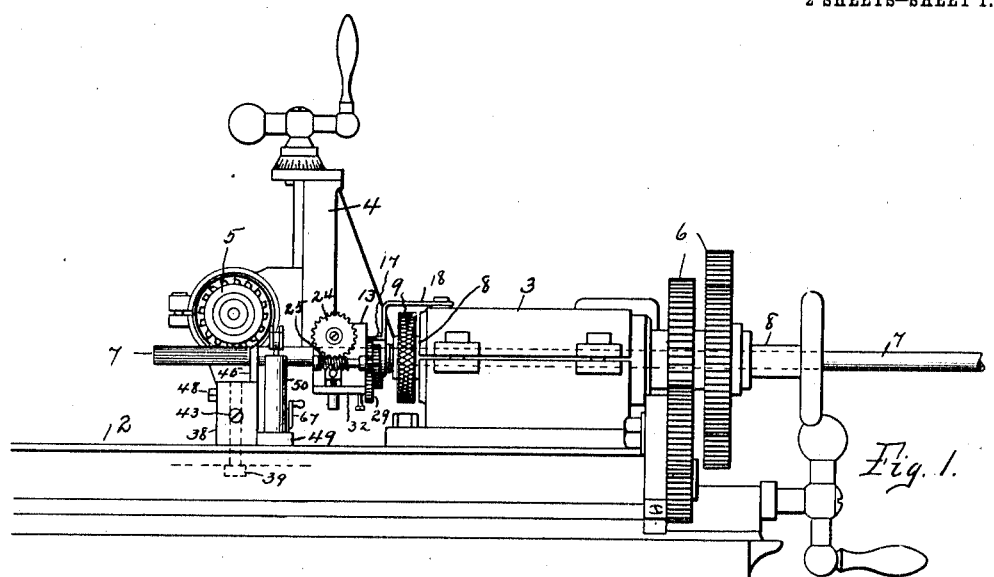

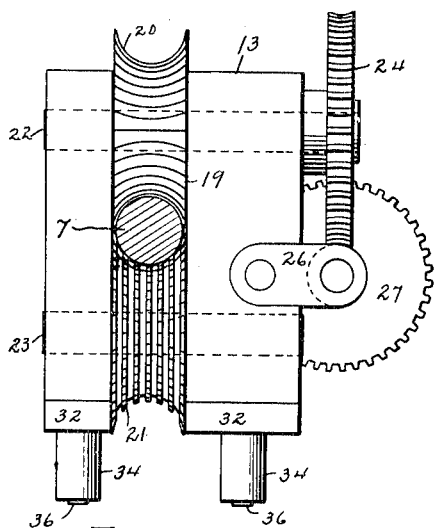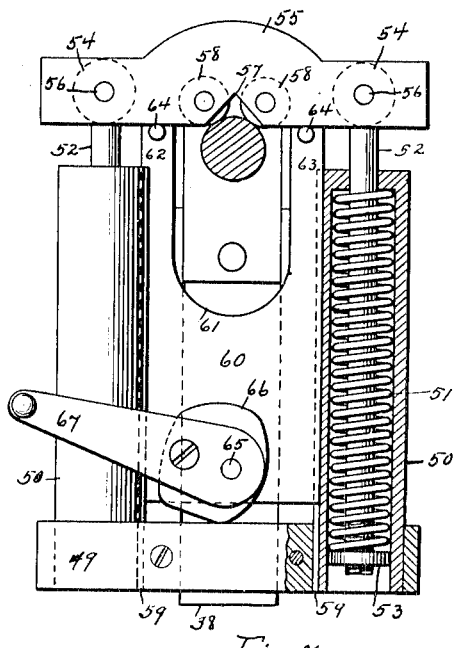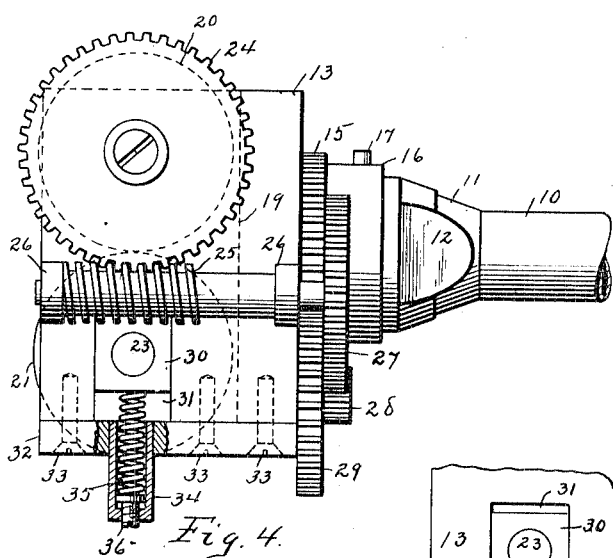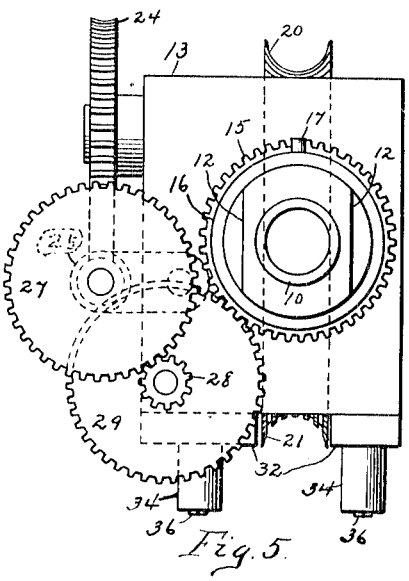

ERNEST PEDERQUIST, OF NEWARK, NEW JERSEY, ASSIGNOR TO MEISSELBACH-CATUCCI MANUFACTURING COMPANY, A CORPORATION OF NEW JERSEY.

FEED-ROLLER MECHANISM FOR PINION-ROD CUTTING.

1,096,856.   Specification of Letters Patent.   Patented May 19, 1914.

Application filed November 26, 1912. Serial No. 733,588.

*To all whom it may concern:*

Be it known that I, ERNEST PEDERQUIST, a citizen of the United States, residing in the city of Newark, county of Essex, and State of New Jersey, have invented certain new and useful Improvements in Feed-Roller Mechanism for Pinion-Rod Cutting, of which the following is a specification.

Pinon rods have become a staple product in the mechanic arts, so much so that they are made in large quantities and in varying sizes. It has been the custom hitherto to cut pinion rods in short lengths, as from six inches to one foot for the reason that suitable machines for their economic manufacture in greater lengths have not as yet been put upon the market. Again, it has been the custom to cut such rods by means of a single cutter milling machine which will cut only a single longitudinal groove at a time, and from the nature of such machines only short lengths of rods can be utilized for the purpose. This makes the manufacture of such rods quite expensive, and the lengths of the rods so produced limited to the distance between the centers of the machine. Moreover, in practice, the milling of teeth in pinion rods, as well as the milling of teeth in gangs of spur gears, very often produces defective work, in that the indexing is not perfect and so called "fat" toothed rods or gears are the result.

The "hobbing" of gears and pinion rods seems to be the only reliable way of producing perfect teeth.

In the patent to Pliny Catucci, No. 978,113, dated Dec. 6, 1910 is shown a hobbing gear cutter, which in practice has proven to be very successful in cutting gears and pinions and my invention is in the nature of an attachment to the machine of the patent, whereby I am enabled to produce pinion rods of any length, such length being limited only by the length of the blank rod upon which the teeth are to be cut.

The improvement therefore, has for its object the provision of means for continuously feeding a blank pinion rod to a hob cutter giving said rod not only a travel in the direction of its axis but also a rotary motion so that the hobbing cutter may simultaneously and continuously cut all of the teeth in the rod.

It also contemplates the provision of a suitable rest or guiding means for the rod as it is fed against the cutter, the purpose of such rest or guiding means being to overcome the tendency of the rod to spring out of alinement under the strain of the cutter.

In the accompanying drawings which illustrate my invention Figure 1 is a side elevation of the rest and feeding mechanism in position upon the bed of a Catucci gear cutter. Fig. 2 is a sectional view substantially through the axis of the pinion rod. Fig. 3 is a front view of the feeding device. Fig. 4 is a side elevation of the same showing the gear plan. Fig. 5 is a rear view showing the driving gear plan. Fig. 6 illustrates a modified form of yielding bearing for one of the feed rollers. Fig. 7 is a front elevation partly in section of the rest. Fig. 8 is a sectional view of part of the rest, showing the fastening means for securing the rest body to the gear cutter bed.

In the drawings and specification similar reference numerals are used to designate like parts throughout.

The structure shown in Fig. 1, is a portion of the Catucci's hobbing gear cutter and shows a portion of the bed 1, with the ways 2, and headstock 3 mounted thereon. The cutter standard 4, is also mounted upon the bed 1, and carries the cutter 5, which is the ordinary hobbing cutter.

The change gears 6, for driving the spindle within the headstock, and all of the main parts are substantially the same as shown in Catucci's patent above mentioned, and need not be further described, than to say that instead of being set for the cutter to advance upon the work piece, the cutter standard feed is disconnected and such standard is held stationary, while the feeding mechanism of my invention is designed to advance the work piece (in this case the rod 7) upon the cutter 5.

The headstock 3 is provided with the usual hollow spindle 8 driven by the change gears 6, and at the forward end of said spindle is located a chuck 9, of any usual or preferred type, for holding a head center or tool. In the present case the chuck is utilized for holding the hollow shank 10 of my improved feeding device.

I have not deemed it necessary to illustrate or describe the mechanism for driving the change gears 6, or the cutter 5; they are the same as described and shown in the patent to Catucci above named.

I will now proceed to describe my improved feeding device. It consists of the hollow cylindrical shank 10, which as above described is firmly held in the chuck 9, upon the spindle 8. It has the conical part 11, for properly centering it in the chuck. This conical portion is also flattened at 12, for the purpose of affording a wrench or vise hold in order that the shank may be firmly screwed into the supporting block 13, as shown in Fig. 2. The shank 10 is further provided with a reduced cylindrical bearing 14, upon which the gear 15, is mounted. The gear 15, is provided with an elongated hub 16, into which is securely fixed the pin 17, over which the arm 18, extends, said arm being rigidly secured to some fixed part of the machine, as for example, the headstock 3. This arrangement permits the shank 10 to rotate freely within the gear 15 and its hub 16, while the latter is held from rotating by means of the rigid arm 18.

The supporting block 13 is generally rectangular in shape, and, as above indicated, is firmly screwed upon the end of the shank 10 as shown. It is provided with the slot 19, cut into its front face to receive the two feed rollers 20, 21, which are mounted upon the cross shafts 22 and 23, extending through the side walls of the block 13. Upon the end of the shaft 22, is mounted the worm-wheel 24, which engages the worm 25, the latter mounted in bearings 26, 26, upon the side of the block 13. Upon the rear projecting end of the worm 25, is rigidly secured the gear 27, meshing with the pinion 28, which latter is secured to the gear 29 in position for engagement with the gear 15 upon the shank 10. The arrangement of the train of gears just described is such that the relative rotation of the gear 15, with respect to the shank 10 and the block 13, will produce a positive rotation of the feed roller 20; or what amounts to the same thing, when the shank 10 and block 13 are rotated by the driving gears 6, while the gear 15 is held against rotation by the arm 18, a positive rotation of the feed roller 20, and the consequent advance of the rod 7 takes place.

The bearings 30 for the shaft 23 are located in open slots 31 in the block 13. The cross bars 32 are rigidly secured to the block 13 across said slots 31 by means of screws 33 and in said cross bars 32 are rigidly secured the spring barrels 34, within which are located the coil springs 35 which bear upon the bearings 30 so as to afford a strong but yielding pressure upon the shaft 23 and through said shaft upon the feed roller 21. The spring 35 may be adjusted by means of the small headed screws 36 which are threaded into the outer ends of the barrels 34, as will be readily understood. I find that I may dispense with the spring barrels in some cases and substitute therefor a block of wood 37 locating the same between the bearings 30, and the cross bars 32, as shown in Fig. 6. The blocks of wood are sufficiently yielding to afford the necessary pressure upon the shaft 23 to cause the feed roller 21 to bite into the rod 7. As shown in Fig. 3 the two feed rollers 20 and 21 are knurled, the roller 21 being knurled across its circumference so as to bite into the rod 7, and since the roller 20 is a live roller, it produces a longitudinal feed of the rod 7. The roller 21 is not only cross knurled but is circumferentially grooved as shown, so that there will be no tendency in the rod 7 to accidentally twist as it is fed against the hob-cutter 5.

I regard the above described knurling of the two rollers 20 and 21 as important features of my improvement, inasmuch as the live roller 20 produces the longitudinal feeding of the rod while the circumferentially grooved roller 21 prevents the accidental twisting of the rod between the rollers, and yet permits the said rod to advance upon the cutter 5 with a sort of screw motion which is necessary to the proper cutting of the teeth in the rod.

I will now proceed with the description of the rest or guide for the rod 7, the details of which are fully illustrated in Figs. 2 and 7. It consists of the block 38 secured to the ways 2 of the machine by means of the T-headed bolt 39, the head of which extends into the usual T-slot in said bed and extends up into the vertical aperture 40 in the block 38. The upper end of the bolt 39 is provided with a conical cavity 41, into which extends the conical point 42 of the screw 43, the latter being screwed laterally through the side wall of the block 38 as shown in Fig. 8.

The forward side of the block 38 is provided with a vertical groove 44, into which is fitted the vertical rest piece 45, the upper end of which is provided with the aperture 46 of a diameter sufficient to receive the rod 7. The upper end of the rest piece 45 is chamfered off as at 47, so as to clear the teeth of the cutter 5 and yet permit the rest piece 45 to be located very close to the cutter. The block 45 is rigidly held in the slot 44 by means of the bolt 48 extending through the block 38 and screwed into the lower end of the rest piece 45 as clearly shown in Fig. 2. Extending forwardly from the lower end of the block 38 and rigidly secured thereto is the step 49 which is located in the position to rest upon the upper face of the ways 2 of the machine. In the ends of this block 49 are rigidly secured the two spring barrels 50 within which are located the compression springs 51. Within these springs 51 and extending through the upper ends of the barrels 50 are the spring rods 52, said rods each being provided at their lower ends with the nuts 53 adjustably secured in place so as to confine the springs 51 between said nuts and the upper ends of the spring barrels 50. The upper ends of the rods 52 are provided with the apertured heads 54 to which the two equalizing bars 55 are secured, by means of the pins 56. These two equalizing bars are notched as at 57 and are provided with the two antifriction rollers 58 which bear upon the rod 7, as the same is fed through the device against the cutter 5. The tendency of the compression springs 51 is to hold the rod 7 down against the lower side of the aperture 46 of the rest piece 45, and thereby prevent the chattering of the rod as it travels against the cutter. In devices of this kind where a work piece is fed against a revolving hob-cutter, the tendency of the cutter is to cause the work piece to rise with the result that the cutter will dig into the metal of the work piece, deeper and deeper, and thus produce imperfect work. This spring mechanism just described entirely overcomes this tendency and holds the work piece practically rigid against the lower side of the aperture 46 of the rest piece 45.

As thus far described, the rod 7 is understood to be in position, as shown in Figs. 1, 2, and 7. In practice however, were not some means provided to elevate the cross head 55 with its rollers 58, the springs 51 would draw said cross head and rollers down to a position which would interfere with the insertion of the rod 7 beneath said rollers. In order therefore to elevate the cross head so as to permit of the insertion of the work piece beneath said rollers 58, I provide the following mechanism: The two spring cups 50 are provided with the vertical grooves 59 which serve as guides for the edges of the vertical plate 60. The upper end of the plate 60 is notched out as at 61 so as to permit of the free passage of the rod 7 and also to provide a space for the operator to properly locate the rest 45 in its groove 44. This makes the upper end of the plate 60 bifurcated into the two arms 62, 63, the upper ends of which are provided with the two cross pins 64 which bear upon the lower edges of the two equalizing bars 55. Pivoted at 65 in the lower end of the plate 60 is the cam 66 in position to bear upon the upper face of the block 49. The arm or handle 67 is rigidly secured to the cam 66 so that it may be swung from side to side and thus cause the plate 60 to slide up and down in its guides 59, and when properly elevated the pins 64 will lift the equalizing bars 55 to a position to permit the free passage of the rod 7 into position for cutting the teeth thereon. The springs 51 in the barrels 50 are made quite heavy so as to cause the rollers 58 to bear with considerable pressure upon the rod 7 and thus prevent the tendency of said rod to rise through the cutting action of the teeth of the cutter 5.

The two devices are used in conjunction for the purpose of cutting pinion rods of any size commensurate with the capacity of the machine. For different sized rods change feed rollers 20, 21 are provided as also different rest pieces 45 having different sized apertures 46.

By the mechanism above described, I am enabled to cut pinion rods of any length as it is only necessary to set the parts in position and start the cutting action. So long as power is applied to the machine, the cutting will take place until the end of the rod is reached.

As above described, pinion rods have become a staple article in the market and users of such rods cut them into various thicknesses for various uses in the mechanic arts; but hitherto, so far as I am aware, the lengths of such rods have been limited to from 6 in. to 1 ft., this of course being due to the capacities of the machines designed for the cutting of such rods.

In operation, the rod 7 is inserted through the hollow spindle 8 of the cutter and through the shank 10, between the rollers 20 and 21 and finally through the aperture 46 of the rest 45, as clearly shown in Fig. 1. When the machine is started, the cutter 5 begins to rotate and the spindle 8 also rotates through the driving gears 6, as clearly shown in Catucci patent above named. The rotation of the spindle 8, and with it the shank 10 and block 13, causes the longitudinal feeding of said rod 7 against the cutter 5 and simultaneously said rod 7 is given a rotation upon its axis along with the spindle 8. The hob-cutter 5, therefore produces in the rod 7, the fluted periphery, or what is known in the art as pinion rod.

I claim:

1. In a pinion rod feeding mechanism, the combination of a rotatable block, a pair of feed rollers mounted in said block, and means for positively rotating one of said rollers, said means being actuated by the rotation of said block.

2. In a pinion rod feeding mechanism the combination of a rotatable block, a hollow chucking shank secured to said block, a pair of feed rollers, rotatably mounted in said block, and means actuated by the rotation of said block upon the axis of said shank for positively rotating one of said feed rollers.

3. In a pinion rod feeding mechanism, the combination of a rotatable block, a pair of feed rollers rotatably mounted in said block, a supporting shank for said block, a hollow spindle in which said shank is rigidly secured, and means actuated by the rotation of said block and spindle for positively rotating one of said feed rollers.

4. In a pinion rod feeding mechanism the combination of a supporting block, means for rotatably mounting said block in a gear cutting machine, a pair of feed rollers rotatably mounted in said block, and means actuated by the rotation of said block in said gear cutting machine for positively rotating one of said rollers.

5. In a pinion rod feeding mechanism the combination with the hollow rotating spindle of a gear cutting machine, of a supporting block, means for securing said block to said hollow spindle to rotate therewith, a pair of feed rollers rotatably mounted in said block, and means actuated by the rotation of said block and spindle for positively rotating said feed rollers to draw a pinion rod therebetween.

6. In a pinion rod feeding mechanism the combination of a hollow chucking shank, a supporting block rigidly secured to said shank, a pair of feed rollers rotatably mounted in said block with their peripheries alined with said hollow shank, a gear concentrically mounted upon said shank and relatively rotatable thereupon, a train of reducing gears leading from said gear to one of said feed rollers, whereby the relative rotation of said first named gear with respect to said shank will produce a positive rotation of said last named feed roller.

7. In a pinion rod feeding mechanism the combination with a supporting block of a pair of feed rollers rotatably mounted in said block, a hollow chucking shank rigidly secured to said block in alinement with the adjacent peripheries of said rollers, a stationary gear wheel concentrically mounted upon said shank within which said shank may rotate, and a gear train connecting said gear wheel and one of said feed rollers whereby the rotation of said shank within said gear wheel will produce a positive rotation of last named feed roller.

8. In a pinion rod cutting machine the combination with a rotary hob cutter, of means for simultaneously rotating and continuously feeding a blank pinion rod to said cutter and stationary means for rigidly supporting said rod immediately adjacent to the cutter teeth.

9. In a pinion rod cutting machine the combination with a rotating hob cutter, of means for simultaneously rotating and continuously feeding a blank pinion rod to said cutter and stationary means located immediately adjacent to said cutter, for restraining the tendency of said rod to rise out of its axial path.

10. In a pinion rod cutting machine, the combination with means for simultaneously rotating and continuously feeding a pinion rod in the direction of its length, of a support for said rod rigidly mounted upon the frame of said machine in advance of said feeding means and means for resiliently pressing said rod upon said support as it is advanced by said feeding means.

11. In a pinion rod cutting machine the combination of a rotating hob cutter with means for simultaneously rotating and continuously feeding a pinion rod blank in the direction of its axis to said cutter, and means rigidly fixed upon the frame of said machine beneath said cutter to constrain said rod to follow its axial path.

12. In a pinion rod cutting machine the combination with a rotating cutter of means for simultaneously rotating and continuously feeding a blank pinion rod in the direction of its axis to said cutter, a support rigidly fixed upon the frame of said machine for preventing said rod from springing away from said cutter, and resilient means for holding said rod against said support.

13. In a feeding mechanism for pinion rod cutting machines, the combination of means for simultaneously rotating a blank pinion rod and advancing it in the direction of its axis against a hob cutter, with means rigidly fixed upon the frame of said machine adjacent to said cutter for constraining said advancing rod to travel in its axial path.

14. In a pinion rod cutting machine the combination of a rotating hob cutter means for simultaneously rotating and axially advancing a blank pinion rod against said cutter, a support rigidly fixed upon the frame of said machine for preventing said advancing rod from springing away from said cutter, and a pair of spring pressed anti-friction rollers adapted to bear upon said advancing rod to hold it against said support.

15. In a pinion rod cutting machine, the combination of a rotating hob cutter, means for simultaneously rotating and axially advancing a blank pinion rod against said cutter, a rigid support for preventing said rod from springing away from said cutter, spring barrels mounted upon said support, compression springs within said barrels, a cross-head connection for said springs and anti-friction rollers mounted in said cross-head adapted to bear upon said advancing rod to hold it against said support.

16. In a pinion rod cutting machine, the combination with a supporting block, of a pair of feed rollers rotatably mounted in said block, a hollow chucking shank rigidly secured to said block in alinement with the adjacent peripheries of said rollers, means for rotating said block, and for independently rotating said rollers, a rotary hob cutter and means rigidly mounted upon said cutting machine for supporting a work piece immediately adjacent to the cutter teeth.

17. In a pinion rod cutting machine, the combination with a rotating hob cutter, means for simultaneously rotating and continuously advancing a blank pinion rod to said cutter comprising a rotatable block and a pair of feed rollers rotatably mounted in said block and means located immediately adjacent to said cutter for restraining the tendency of said rod to rise out of its axial path.

18. In a pinion rod cutting machine, the combination with means for simultaneously rotating and continuously feeding a pinion rod in the direction of its length, comprising a rotatable block and a pair of feed rollers rotatably mounted in said block, of a support for said rod rigidly mounted upon the frame of said machine adjacent to said feeding means, and means for resiliently pressing said rod upon said support as it is advanced by said feeding mechanism.

19. In a pinion rod cutting machine, the combination of a rotating hob cutter with a block rotatably mounted in said machine, a pair of feed rollers rotatably mounted in said block whereby a pinion rod blank may be simultaneously fed in the direction of its axis to said cutter, and means rigidly fixed upon the frame of said machine beneath said cutter to constrain said rod to follow in its axial path.

20. In a pinion rod cutting machine, the combination with a rotating hob cutter, of means for simultaneously rotating and continuously feeding a blank pinion rod in the direction of its axis to said cutter, comprising a block rotatably mounted in said cutting machine, a pair of feed rollers rotatably mounted in said block, a rigid support mounted upon the frame of said machine immediately adjacent to said cutter to prevent said rod from springing away from said cutter, and resilient means for holding said rod against said support.

21. In a feeding mechanism for pinion rod cutting machines, the combination of means for simultaneously rotating a blank pinion rod and advancing it in the direction of its axis against a hob cutter, with a rigid support mounted upon the frame of said machine adjacent to said cutter for constraining said advancing rod to travel in its axial path.

22. In a pinion rod cutting machine, the combination of a rotating hob cutter, means for simultaneously rotating and axially advancing a blank pinion rod against said cutter, comprising a block rotatably mounted in said machine and a pair of driven feed rollers rotatably mounted in said block, a support rigidly mounted upon the frame of said machine adjacent to said cutter for preventing said advancing rod from springing away from said cutter, and a pair of spring pressed anti-friction rollers adapted to bear upon said advancing rod to hold it against said support.

ERNEST PEDERQUIST.

In presence of—
   L. M. SANDERS,
   NORMAN E. ZUSI.

---

Copies of this patent may be obtained for five cents each, by addressing the "Commissioner of Patents, Washington, D. C."